United States Patent
Paik et al.

(10) Patent No.: US 7,599,994 B2
(45) Date of Patent: Oct. 6, 2009

(54) SYSTEM AND METHOD FOR EMAILING AND CHATTING

(75) Inventors: Chul Hwa Paik, 306-303, Hanyang Apt., Seohyun-dong, Bundang-ku, Seongnam-shi, Kyungki-do (KR); Hyun Sun Yu, Seoul (KR)

(73) Assignee: Chul Hwa Paik (KR)

( * ) Notice: Subject to any disclaimer, the term of this patent is extended or adjusted under 35 U.S.C. 154(b) by 0 days.

(21) Appl. No.: 11/213,591

(22) Filed: Aug. 24, 2005

(65) Prior Publication Data
US 2005/0289223 A1 Dec. 29, 2005

Related U.S. Application Data

(63) Continuation of application No. 09/859,568, filed on May 16, 2001, now abandoned.

(30) Foreign Application Priority Data
Nov. 29, 2000 (KR) .............................. 2000-71525

(51) Int. Cl.
*G06F 15/16* (2006.01)
(52) U.S. Cl. ..................................... 709/206; 709/207
(58) Field of Classification Search .......... 709/206–207
See application file for complete search history.

(56) References Cited

U.S. PATENT DOCUMENTS

| 5,862,330 | A | * | 1/1999 | Anupam et al. ............. 709/204 |
|---|---|---|---|---|
| 5,907,677 | A | * | 5/1999 | Glenn et al. ................. 709/206 |
| 6,061,349 | A | | 5/2000 | Coile et al. |
| 6,118,856 | A | | 9/2000 | Paarsmarkt et al. |
| 6,246,997 | B1 | | 6/2001 | Cybul et al. |
| 6,272,214 | B1 | * | 8/2001 | Jonsson ................. 379/202.01 |
| 6,292,900 | B1 | | 9/2001 | Ngo et al. |
| 6,295,536 | B1 | | 9/2001 | Sanne |
| 6,405,225 | B1 | | 6/2002 | Apfel et al. |
| 6,442,590 | B1 | * | 8/2002 | Inala et al. ................... 709/204 |
| 6,499,055 | B1 | | 12/2002 | Yamaguchi |
| 6,513,013 | B1 | | 1/2003 | Stephanou |
| 6,564,261 | B1 | * | 5/2003 | Gudjonsson et al. ........ 709/227 |
| 6,771,290 | B1 | | 8/2004 | Hoyle |
| 6,829,585 | B1 | | 12/2004 | Grewal et al. |
| 6,839,737 | B1 | * | 1/2005 | Friskel ....................... 709/206 |
| 6,865,161 | B1 | * | 3/2005 | Sponaugle et al. .......... 370/261 |
| 7,013,326 | B1 | * | 3/2006 | Suzuki et al. ............... 709/204 |
| 7,058,892 | B1 | * | 6/2006 | MacNaughton et al. ..... 715/738 |
| 7,167,552 | B1 | * | 1/2007 | Shaffer et al. .......... 379/202.01 |
| 2001/0034689 | A1 | * | 10/2001 | Heilman, Jr. ................. 705/37 |
| 2002/0002586 | A1 | * | 1/2002 | Rafal et al. ................. 709/205 |
| 2004/0128356 | A1 | | 7/2004 | Bernstein et al. |
| 2005/0198167 | A1 | * | 9/2005 | Roskowski et al. ......... 709/206 |

FOREIGN PATENT DOCUMENTS

KR 2000-0054559 9/2000

* cited by examiner

*Primary Examiner*—Ramsey Refai
(74) *Attorney, Agent, or Firm*—Lando & Anastasi, LLP

(57) ABSTRACT

A system and method for emailing and chatting comprising a pair of web browsers of the sender and the receiver, Internet contacting units for connecting to the web browsers, an email server for sending-receiving email between the sender and the receiver, and a chatting-mailing server for emailing and chatting between the sender and the receiver is disclosed.

3 Claims, 4 Drawing Sheets

SYSTEM AND METHOD FOR EMAILING AND CHATTING

CROSS REFERENCE TO RELATED APPLICATIONS

This application is a continuation of the earlier patent application entitled "SYSTEM AND METHOD OF SIMULTANEOUSLY EXECUTING POP E-MAILING AND CHATTING AND GOODS PUBLICITY SYSTEM AND METHOD THEREBY AND INTERNET SHOPPING MALL," Ser. No. 09/859,568, filed May 16, 2001, now abandoned, which claims priority to Korean Patent Application No. 2000-71525 filed Nov. 29, 2000, the disclosures of which are hereby incorporated herein by reference.

BACKGROUND OF THE INVENTION

This invention relates to a system and a method for emailing and chatting, more particularly, to a goods publicity system and method using emailing and chatting in Internet shopping.

In general, email and chatting are executed by using wired or wireless network systems and thereby communication between a sender and a receiver is realized. However, there are different operational modes between emailing and chatting, one is similar to a letter and the other is similar to a telephone.

More concretely, conventional email send and receive systems such as AOL, ICQ, and so on, are executed by a send and receive operation with only addresses of the sender and the receiver in the header in an email without any special information, and then for chatting, both of the sender and the receiver have to participate in a separated chat room.

Due to the above reason, it is difficult to execute emailing and chatting at the same time, so use of emailing and chatting has been limited in the Internet shopping.

In other words, under a conventional operational type of Internet shopping, a person holding an administrative position (hereinafter, "host") responses to an email inquiry by a customer (hereinafter, "user") using only email.

However, the above operational type, in the user's view, requires a lot of time to get information about the goods, and the user may quit a purchase of goods when the communication with the host is executed using only email.

SUMMARY OF THE INVENTION

It is an object of the present invention to provide a system and a method for emailing and chatting between a sender and receiver.

It is another object of the present invention to provide a goods publicity system and method using the method for emailing and chatting between the host and the user in Internet shopping, thereby shortening the time to get the information about goods to the user and executing the communication between the host and the user without a delay.

In order to achieve the above-mentioned objects, the inventive emailing and chatting system includes a pair of web browsers for the sender and the receiver, Internet contacting units for connecting to the web browsers, an email server for sending-receiving of email between the sender and the receiver, and a chatting and emailing server (hereinafter, "CHmail server") to enable chatting between the sender and the receiver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiment of the present invention, an example of which is illustrated in the accompanying drawings.

A CHmail program executing chatting and emailing according to the present invention performs the following steps:

sending and receiving the email, and inserting further elements distinguishing the sender and the receiver into the header of the email.

For reference, the CHmail program has been registered as improved program on Dec. 4, 2000 in Korea by the applicant.

In the header of the email, a log-in ID of a CHmail server, an IP address/host name of a computer of the email sender, and a port number are included. The CHmail server comprises a first database in which a table having the log-in ID, and the IP address/host name are stored and a second database in which another table having the port number, the log-in ID are stored.

Figure 1:
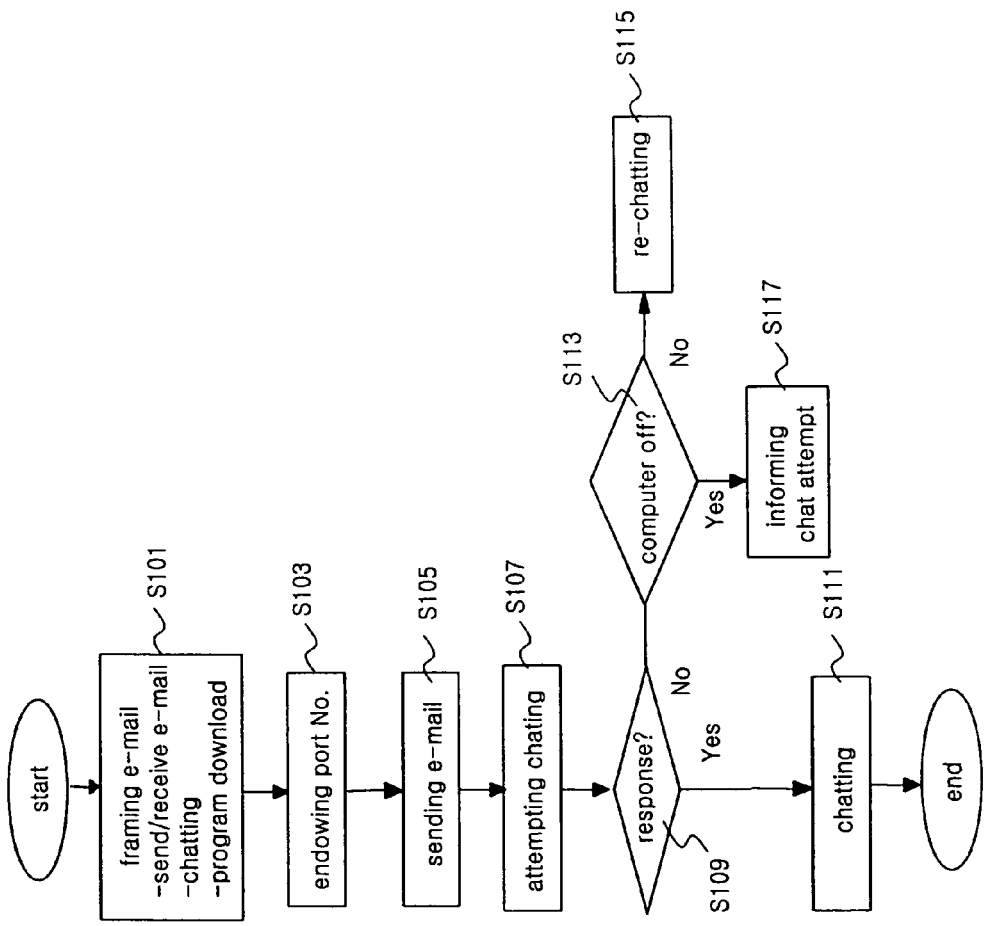
FIG. 1 is a flow chart showing a method for emailing and chatting according to the present invention.

FIG. 1 is a flow chart showing a method for emailing and chatting according to the present invention.

Referring to FIG. 1, the method for emailing and chatting according to the present invention comprises the steps of framing an email after turning on the CHmail program, S101, endowing a port number by the CHmail server, S103, sending the email to the receiver, S105, attempting a chat with the sender by the email receiver, S107, confirming the response of the chat receiver, S109, and chatting between the email sender and the receiver using chat client programs on each computer, S111.

When there is no response by the chat receiver (the email sender) to a chat attempt by the chat sender, the above-captioned method further comprises the steps of confirming on/off status of the computer of the chat receiver, S113, successively attempting chatting when the computer of the chat receiver is an "on status", S115, and automatically alarming the chat attempt to the chat receiver through the CHmail server when the computer of the chat receiver is an "off status", S117.

On the other hand, in the above chatting-to-mailing process according to the present invention, it is possible to execute a mailing-to-mailing process.

Hereinafter, a detailed description in the above-identified steps will be explained.

Firstly, the email sender and the email receiver each register their log-in ID through the CHmail server and download the CHmail program from an Internet site on which the CHmail program is provided. Further, the email sender drives the CHmail program thereby forming the first database by automatically registering the log-in ID and the IP address/host name through the CHmail server. At this time, the IP address/host name of the log-in ID is automatically updated on the CHmail server when the CHmail program is driven. Namely, if the IP address/host name of the log-in ID is changed, the IP address/host name of the first database of the CHmail server is updated. As a result, the first database has the IP address/host name used in the most recent log-in ID.

Secondly, the email sender gets the port number to drive the chat server program by inputting the log-in ID to the CHmail server thereby forming the second database of the CHmail server. As a result, the IP address/host name used in the most recent log-in ID of the other party may be recognized by only the port number.

Thirdly, the email sender sends the email having the header in which the log-in ID, the port number, and the IP address/host name are provided. After that, the email receiver pushes the chat button if he wants to chat with the email sender. At that time, the CHmail program starts the chat server program corresponding to the port number by sending the log-in ID and the port number in the header of the email to the CHmail server. Then the CHmail programs automatically display the chat client program onto the computers of the email sender and receiver.

If the email sender is not in position, the CHmail server informs the email sender of the chat attempt using, for example, an alarm on the computer where the chat client program is automatically displayed.

Furthermore, so as to reduce any interference on the CHmail server, if the IP address/host name is an accessible address by searching the first and second databases at the same time, the chat server program is started on the computer of the email sender, and then the chat client programs of the email sender and receiver are displayed on their computers. In this case, it is possible to reduce the interference on the CHmail server by removing the chat server program from the CHmail server.

Referring the foregoing, the function of the CHmail server is divided into sub functions of, granting the port number, giving the most recent IP address/host name used in the log-in ID, starting the chat server program appropriating to the granted port number on the CHmail server or the computer of the email sender, and displaying the chat client programs on the computers of the email sender and receiver.

By the above embodiment, the communication between the email sender and receiver is executed using only on the personal computer, another communication using a voice or a picture may be used in other embodiments in accordance with the present invention.

On the other hand, if the email sender sent the email to a receiver of C.C. (carbon copy) as well as the email receiver, it is possible that the communication between the email sender and receiver is executed together with the receiver of C.C. at the same time.

Hereinafter, a goods publicity system and method using the method for emailing and chatting between the host and the user of Internet shopping according to the present invention will be explained in detail.

A goods publicity system using emailing and chatting between the host and the user according to the present invention comprises:

web browsers of the user and the host;

Internet contacting units for connecting the web browsers of the user and the host;

at least one web server connected to the web browsers of the user and the host for communicating between the user and the host;

a CHmail server for emailing and/or chatting between the user and the host;

a first database including a table having the log-in ID and the most recent IP address/host name;

a second database including a table having the port number and the log-in ID of CHmail server;

a member database having information about the user;

an advertisement database having a plurality of advertisement information; and a network protective system.

A goods publicity method using emailing and chatting between the host and the user according to the above system comprises the steps of:

contacting to an Internet shopping mall by the user;

confirming the user is a mall member or not;

registering the user as the member if he is not a member;

sending an email to the host using a program executing emailing and chatting after selecting goods;

attempting chatting with the user by the host who received the email using the program;

confirming a response of the user; and chatting between the user and the host using the chat client program on their computers.

When there is no response by the user for a chat attempt by the host, the above-captioned method further comprises the steps of:

confirming on/off status of the computer of the user;

successively attempting chatting when the computer of the user is in an "on status"; and automatically alarming the chat attempt to the user when the computer of the user is in an "off status".

At this time, it is assumed that the user and the host are using the program emailing and chatting according to the present invention.

Furthermore, it is possible to change the roles of the user and the host, namely in above step S207, the email may be sent by the host using a program executing emailing and chatting, to the user for goods publicity. In this case, the user may attempt the chat with the host, and except for this point, the communication between the user and the host is executed under the same type of steps as those recited above.

Figure 2:
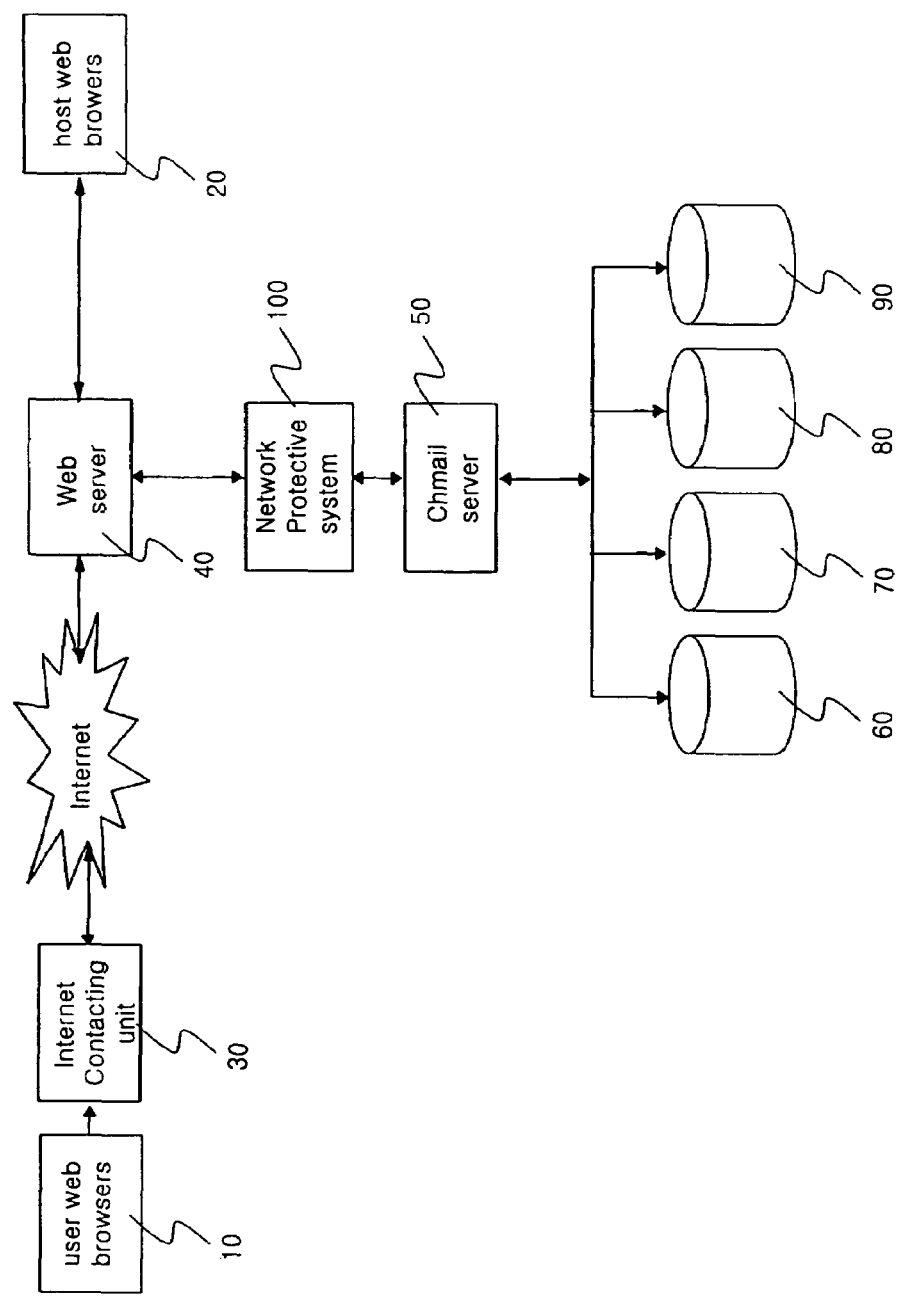
FIG. 2 is a block diagram showing a goods publicity system according to the present invention.

FIG. 2 is a block diagram showing a goods publicity system according to the present invention.

Referring to FIG. 2, a goods publicity system according to the present invention comprises web browsers of the user and the host 10 and 20, Internet contacting unit 30 for contacting web browsers of the user and the host 10 and 20, at least one web server 40 connected to web browsers of the user and the host 10 and 20 for communicating between the user and the host, CHmail server 50 for emailing and/or chatting between the user and the host, first database 60 including a table having the log-in ID, and the most recent IP address/host name, second database 70 including a table having the port number, the log-in ID of CHmail server, member database 80 having information about the user, advertisement database 90 having a plurality of advertisement information, and network protective system 100.

Web browsers 10 and 20 display any data such as an advertisement on the computers of the user and the host.

Internet contacting unit 30 is a control means including on-line means such as a modem, and a dedicated line, or wireless means such as a mobile telephone, a notebook computer, and a PDA (Personal Digital Assistants).

Web server 40 identifies whether the user is a member through user information from member database 80, and transmits an advertisement from advertisement database 90 to web browser 10.

The CHmail server 50 grants the port number and gives the most recent IP address/host name used in the log-in ID and starts the chat server program appropriating to the granted port number on the CHmail server or the computer of the email sender (the user or the host) and displays the chat client programs on the computers of the user and host.

First database 60 includes a table having the log-in ID and the most recent IP address/host name. Second database 70 includes a table having the port number and the log-in ID of CHmail server.

Member database 80 has the user information and use particular to the Internet shopping mall.

Advertisement database 90 has a plurality of advertisements provided by a plurality of member companies and supports displaying of the advertisement data onto the personal computer of the user.

The network protective system 100 prevents an inner system from an outer trouble and prevents the user information from information drain.

Figure 3:
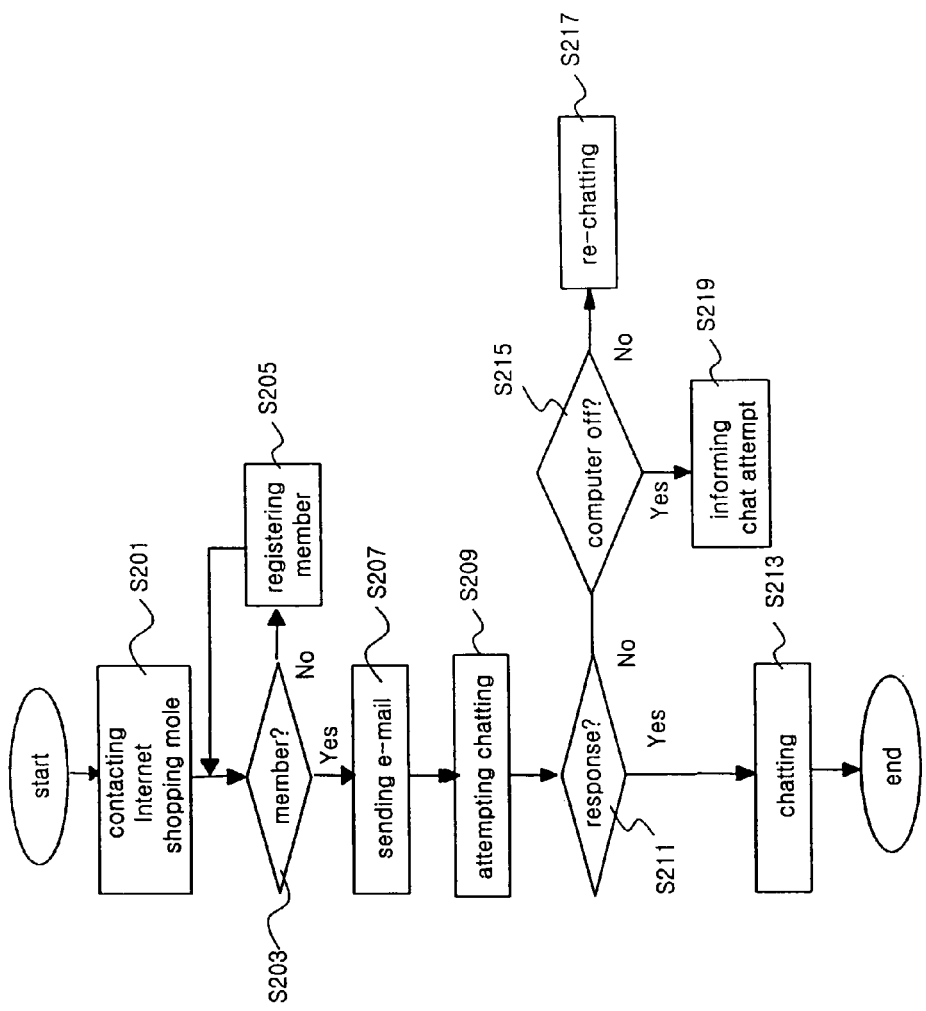
FIG. 3 is a flow chart showing a goods publicity method according to the present invention.
Figure 4:
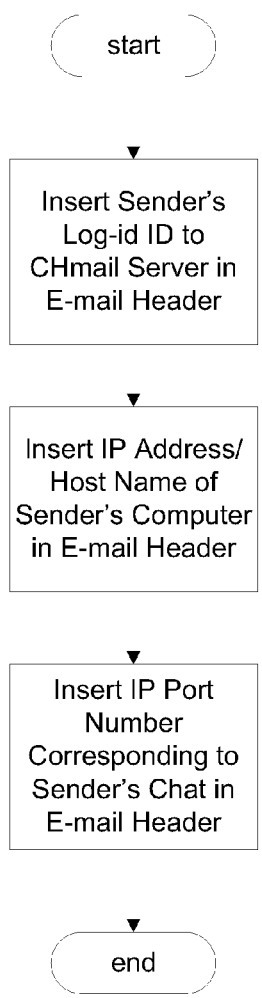
FIG. 4 is a flow chart showing a process for preparing an email according to a embodiment.
Figure 5:
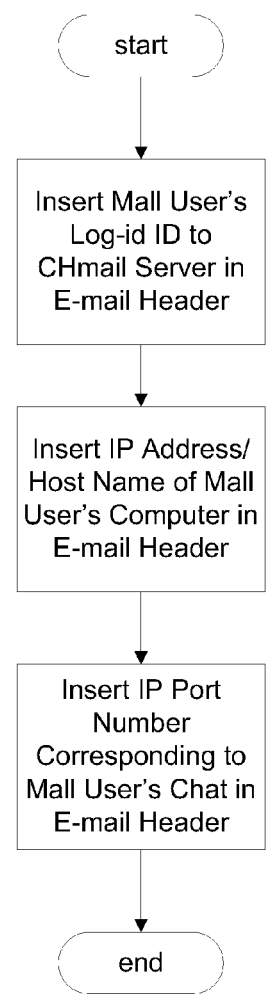
FIG. 5 is a flow chart showing a process for preparing an email according to a embodiment.
Figure 6:
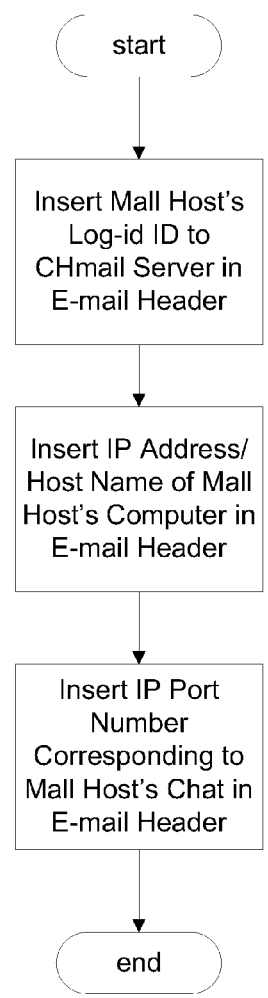
FIG. 6 is a flow chart showing a process for preparing an email according to a embodiment.

FIG. 3 is a flow chart showing a goods publicity method according to the present invention.

A goods publicity method according to the inventive system will be explained in detail hereinafter.

Referring to FIG. 3, firstly, the user contacts to Internet shopping through web server 40 after contacting to the Internet by using the Internet contacting unit 30 including on-line means such as a modem, and a dedicated line, or wireless means such as a mobile telephone, a notebook computer, and the PDA, S201. After that, the user goes through an identification of whether he is shopping mall member or not, S203, if he is not the member, the user has to become a member, S205.

Secondly, the user, as a member, sends an email to the host of the Internet shopping mall after selecting goods, S207, and then the host attempts to chat with the user, S209, and chats with the user after confirming a response by the user, S211, S213. If there is no response by the user for a chat attempt by the host, the host confirms that the computer of the user is "on status" or "off status", S215. After that, the host successively attempts to chat if the computer of the user is an "on status", S217, or, the host makes the computer of the user, automatically alarm if the computer of the user is in a "off status", S219.

Of course, it is possible to change the roles of the user and the host, namely, the chatting attempt may be executed by the user to get goods information.

In accordance with the present invention, it is possible to hold any information through emailing and chatting between the email sender and the email receiver.

In addition, according to the inventive goods publicity system and method, it is possible to shorten the time to get correct information about goods and to execute the communication between the host and the user without a delay.

Other embodiments of the invention will be apparent to those skilled in the art from consideration of the specification and practice of the invention disclosed herein.

It is intended that the specification and examples be considered as exemplary only, with the true scope and spirit of the invention being indicated by the following claims and their equivalents.

What is claimed is:

1. A system for requesting a chat comprising:
a chatting-emailing program disposed in a computer readable storage medium of a device and arranged and configured to create an email having a header section and a body section, to dispose a log-in ID for a CHMail server and an internet protocol (IP) port number corresponding to the chat into the header section and to request the chat based on the log-in ID to the CHMail server and the IP port number corresponding to the chat, the log-in ID to the CHMail server and the IP port number corresponding to the chat each being associated with a sender of the email;
wherein the CHMail server is arranged and configured to receive the log-in ID to the CHMail server and to provide the IP port number corresponding to the chat;
wherein the chatting-emailing program is further arranged and configured to register, with the CHMail server, the log-in ID to the CHMail server and to get, from the CHMail server, the IP port number corresponding to the chat and a most recent IP address associated with a computer of the sender;
wherein the CHMail server is further arranged and configured to receive a host name associated with a computer of the sender and the chatting-emailing program is further arranged and configured to register, with the CHMail server the host name, and
wherein the chatting-emailing program is further arranged and configured to request the chat using the host name and the IP port number corresponding to the chat.

2. The system according to claim 1, wherein the chatting-emailing program is further configured to provide the header section with a host name associated with the sender of the email.

3. The system according to claim 1, wherein the device is a mobile computing device

* * * * *